United States Patent
Petrov (10) Patent No.: US 9,002,732 B2
(45) Date of Patent: Apr. 7, 2015

(54) KEEPING POPULAR ADVERTISEMENTS ACTIVE

(75) Inventor: Sergey Petrov, Dublin, CA (US)

(73) Assignee: eBay Inc., San Jose, CA (US)

( * ) Notice: Subject to any disclaimer, the term of this patent is extended or adjusted under 35 U.S.C. 154(b) by 1901 days.

(21) Appl. No.: 12/102,307

(22) Filed: Apr. 14, 2008

(65) Prior Publication Data

US 2009/0259627 A1    Oct. 15, 2009

(51) Int. Cl.
*G06Q 30/00* (2012.01)
*G06Q 30/02* (2012.01)

(52) U.S. Cl.
CPC ...................................... *G06Q 30/02* (2013.01)

(58) Field of Classification Search
None
See application file for complete search history.

(56) References Cited

U.S. PATENT DOCUMENTS

| | | | | |
|---|---|---|---|---|
| 2004/0225560 | A1* | 11/2004 | Lewis et al. | 705/14 |
| 2005/0060294 | A1* | 3/2005 | Rainey | 707/3 |
| 2006/0143665 | A1* | 6/2006 | Meek et al. | 725/88 |
| 2008/0097927 | A1* | 4/2008 | Renzi | 705/80 |

* cited by examiner

*Primary Examiner* — Rajesh Khattar (74) *Attorney, Agent, or Firm* — Schwegman Lundberg & Woessner, P.A.

(57) ABSTRACT

A computerized method and system for keeping popular advertisements active are provided. Example embodiments may include identifying one or more expiring online content from a plurality of online contents. A popularity of the one or more expiring online content may be determined; and an expiration date of the one or more expiring online content may be extended based on the popularity.

1 Claim, 10 Drawing Sheets

FIG. 10 the widespread use of the Internet has provided an efficient and low-cost platform for advertising. Advertisers may readily select the target consumers for their products or services based on geographic or demographic distributions or other criteria. Many web site owners may benefit from monetizing their web sites by showing advertisements that result in receiving incentives from the advertisers.

KEEPING POPULAR ADVERTISEMENTS ACTIVE

TECHNICAL FIELD

Example embodiments relate generally to the technical field of data management, and in one specific example, to a system and a method for keeping popular advertisements active.

BACKGROUND

Advertising is one of the most important business activities of almost all business entities such as corporations, companies, institutions etc. The widespread use of the Internet has provided an efficient and low-cost platform for advertising. Advertisers may readily select the target consumers for their products or services based on geographic or demographic distributions or other criteria. Many web site owners may benefit from monetizing their web sites by showing advertisements that result in receiving incentives from the advertisers.

BRIEF DESCRIPTION OF THE DRAWINGS

Some embodiments are illustrated by way of example and not limitation in the figures of the accompanying drawings in which.

DETAILED DESCRIPTION

For some example embodiments, expiring online contents may be examined to identify those that are more popular. The expiring online contents that are more popular may be extended. In the following description, for purposes of explanation, numerous specific details are set forth in order to provide a thorough understanding of example embodiments. However, it will be evident to one skilled in the art that the present invention may be practiced without these specific details.

Figure 1:
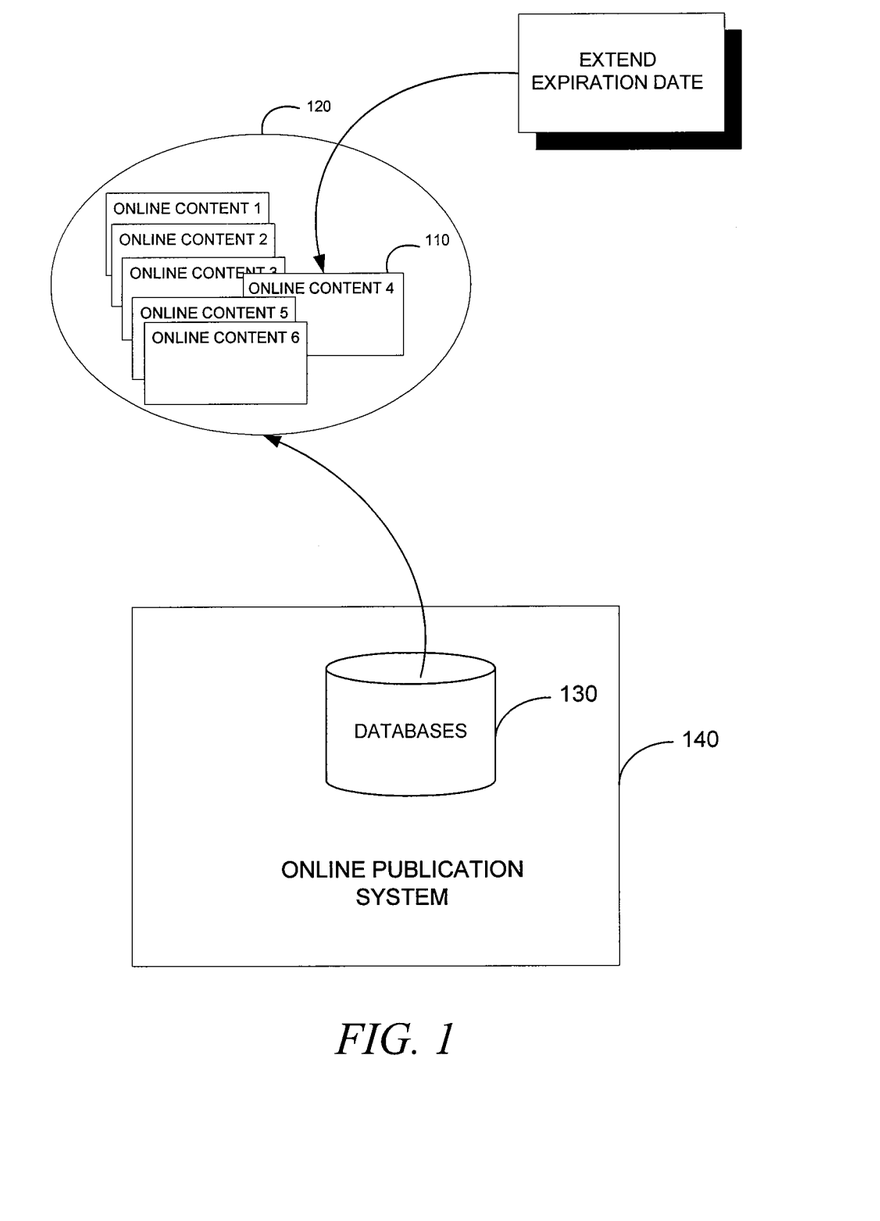
FIG. 1 is a high-level diagram depicting, in an example embodiment, functionality of a system for keeping popular contents active.

FIG. 1 is a high-level diagram depicting, in an example embodiment, functionality of a system for compiling and presenting popular searches. One or more databases 130 of a publication system 140 may include multiple online contents 120. In example embodiments, the online contents 120 may include advertisements. The advertisements may be related to products, services, events, etc. The publication system 140 may identify one or more expiring online contents 110 from the online contents 120. The expiring online contents 110 may include online contents that have reached their expiration date.

The publication system 140 may determine popularity of the one or more expiring online contents 110. For some example embodiments, the determination of the popularity of an online content may be based on a first popularity factor, e.g., a number of direct views of the online content by visitors of a web site associated with the publication system 140 in a predetermined time interval. For some example embodiments, the determination of the popularity may be based on a second popularity factor, e.g., a number of references to the online content by search engines in the predetermined time interval. Some examples of the search engines may include those from YAHOO INC. of Sunnyvale, Calif. and GOOGLE INC. of Mountain View, Calif.

For some example embodiments, the determination of the popularity may be based on both the number of direct views and the number of references in a predetermined time interval (e.g., last week or last two weeks). For some example embodiments, the publication system 140 may associate a weight factor to each of the number of direct views and the number of references and form a combination by using the weight factors as parameters of a linear combination. For example, the popularity may be defined by a popularity index Pi using a linear function such as Pi (N1, N2)=a*N1+b*N2; where parameters a and b may be weights, such as any two numbers that add up to 1, e.g., 0.7 and 0.3 and N1 and N2 represent the number of direct views and the number of references in the predetermined time interval (e.g., last week or last two weeks), respectively. In the current example, the number of direct views is given a weight of "0.7" and the number of references is given a weight of "0.3". For some example embodiments, the popularity index may be based on either the number of direct views or the number of references. Other techniques to determine the popularity of the expiring online contents 110 may also be used.

Depending on the popularity index associated with an expiring online content, the publication system 140 may cause the expiring online content to not expire until after an extension time. For some example embodiments, when the expiring online content is a paid content, approval from a sponsor of the expiring online content may be required before the extension time is applied. When the online content is not a paid content, the extension time may be determined based on the popularity index. The publication system 140 may use an algorithm to determine the extension time based on the popularity index. An example of such algorithm will be discussed below.

Figure 2:
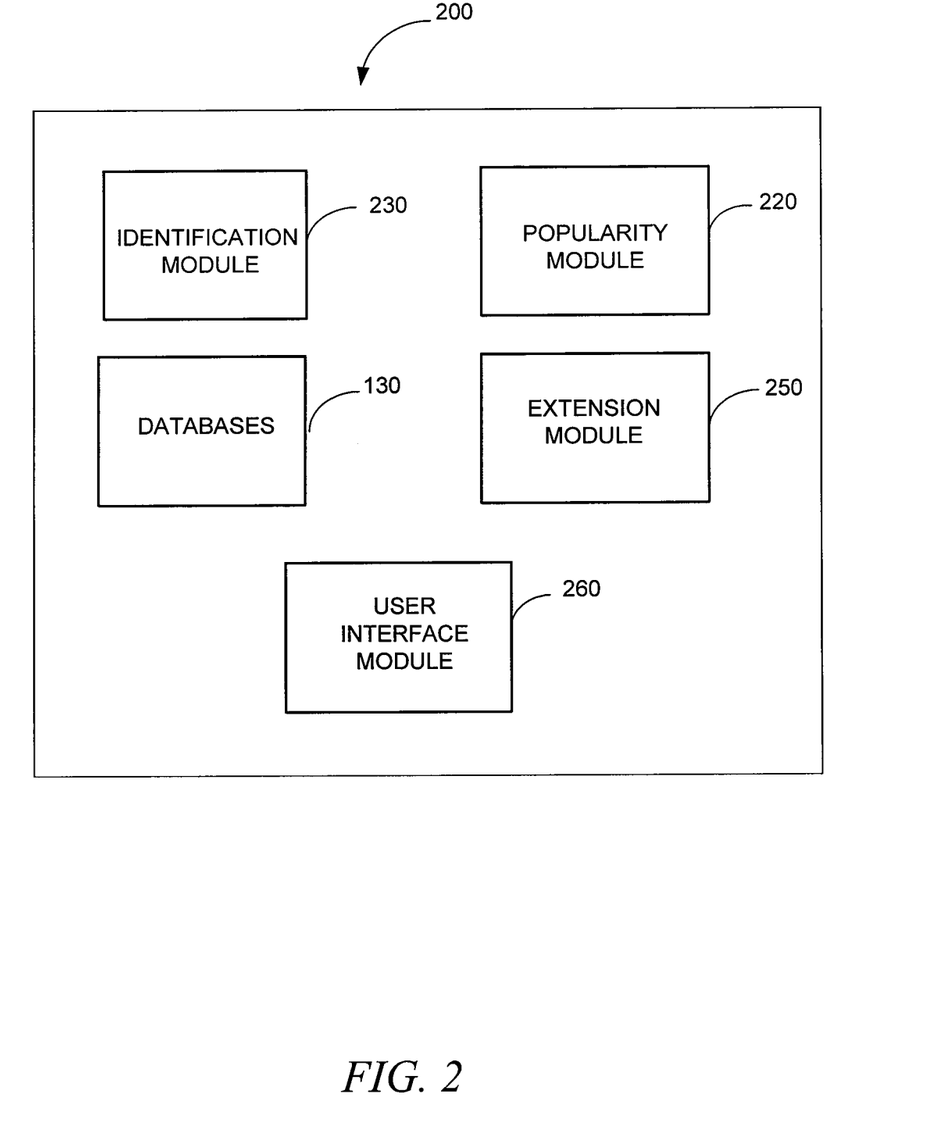
FIG. 2 is a block diagram illustrating an example embodiment of a system for keeping popular contents active.

FIG. 2 is a block diagram illustrating an example embodiment of a system 200 for generating and presenting popular searches. The system 200 may be considered as an example embodiment of the publication system 140 of FIG. 1. The system 200 may include an identification module 230, a popularity module 220, one or more databases 130, an extension module 250, and a user interface module 260.

In example embodiments, the system 200 may also host a web site supported by the user interface module 260, where users may search for items (e.g., products, services, etc.) or visit online contents (e.g., advertisements, articles, etc.). The system 200 may use the databases 130 to store information associated with multiple online contents. The information may include text, image, video, audio, etc. The online contents may be displayed to the users by the user interface module 260.

According to example embodiments, the identification module 230 may identify one or more expiring online contents 110 from the multiple online contents 120. The identification of the expiring online contents 110 may be performed by examining expiration dates associated with the online contents 120 stored in the databases 130. The identification module 230 may examine the expiration dates on a periodic basis, e.g., once a day, to generate a list of the expiring online contents 110.

The popularity module 220 may determine the popularity of the expiring online contents 120. The popularity module 220 may determine the popularity based on at least one of the number of direct views and the number of references associated with each of the online contents 120, in a predetermined time interval (e.g., last week or last two weeks). The popularity module 220 may use a first counter 310 (shown in an example in FIG. 3) to count the number of direct views of each of the online contents 120. The first counter 310 may leverage hit count technologies, such as available hit count codes to count the number of views of the online content.

The popularity module 220 may use a second counter 320 (shown in the example in FIG. 3) to count the number of references to each of the online contents 120. The second counter 320 may use any available technology to count the number references to the online contents.

Figure 3:
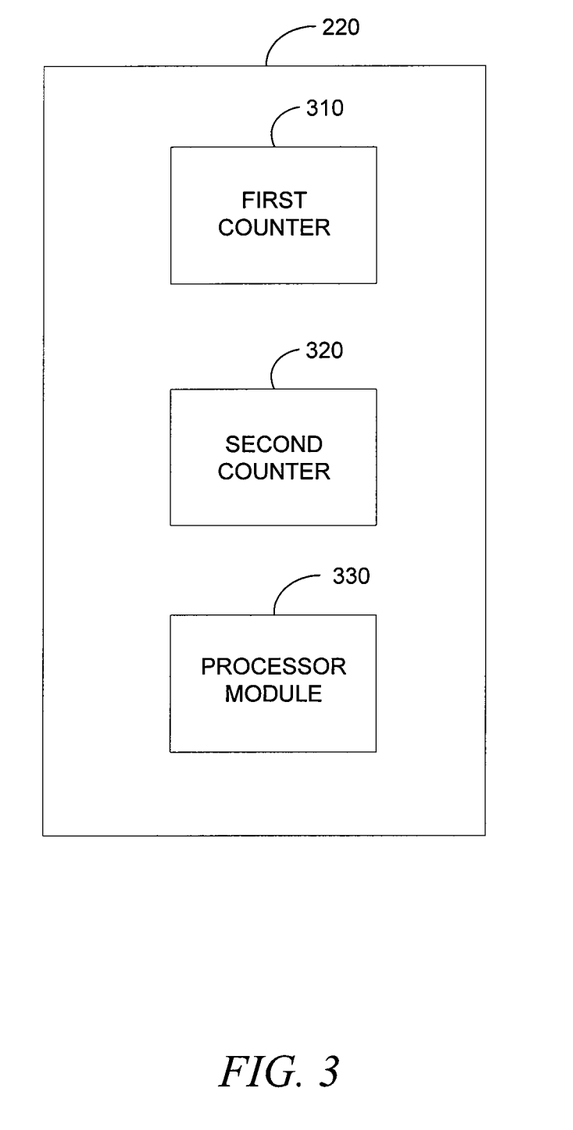
FIG. 3 is a block diagram illustrating, in an example embodiment, components of a popularity module used in FIG. 2.

The popularity module 220 may use the processor module 330 of FIG. 3 to calculate a popularity index, Pi, as a function of the number of direct views and the number of references.

According to an example embodiment, the popularity module 220 may make a list of all online contents 120 associated with the publication system 140. The popularity module 220 may also rank the online contents 120 based on the popularity index Pi. The popularity module 220 may designate a certain top percentage (e.g., top 10%, or top 20%, etc.) of the online contents 120 from the list as popular online contents.

Returning to FIG. 2, the extension module 250 may perform operations associated with extending the one or more expiring online contents 110 based on the popularity. According to example embodiments, the algorithm may define the extension time as a function of the popularity. For example, the algorithm may define the extension time, Te, in terms of the popularity index, Pi, as Te=a+b*Pi; where a and b may represent optional parameters. The extension module may use any values for the parameters, e.g., a=−10 and b=1, for Pi greater than 10, and a=0 and b=0, for Pi less than 10. The extension module 250 may use any other algorithm to define the extension time based on the popularity.

FIG. 3 is a block diagram illustrating, in an example embodiment, components of the popularity module 220 used in FIG. 2. The popularity module 220 may include the first counter 310, the second counter 320, and the processor module 330. As described above, the counters 310 or 320 and processor module 330 are used by the popularity module 220 to determine popularity of the online contents hosted by the system 200 based on the number of direct views (N1) and the number of references (N2) to the online contents by search engines, in a predetermined time interval (e.g., last week or last two weeks).

Figure 4:
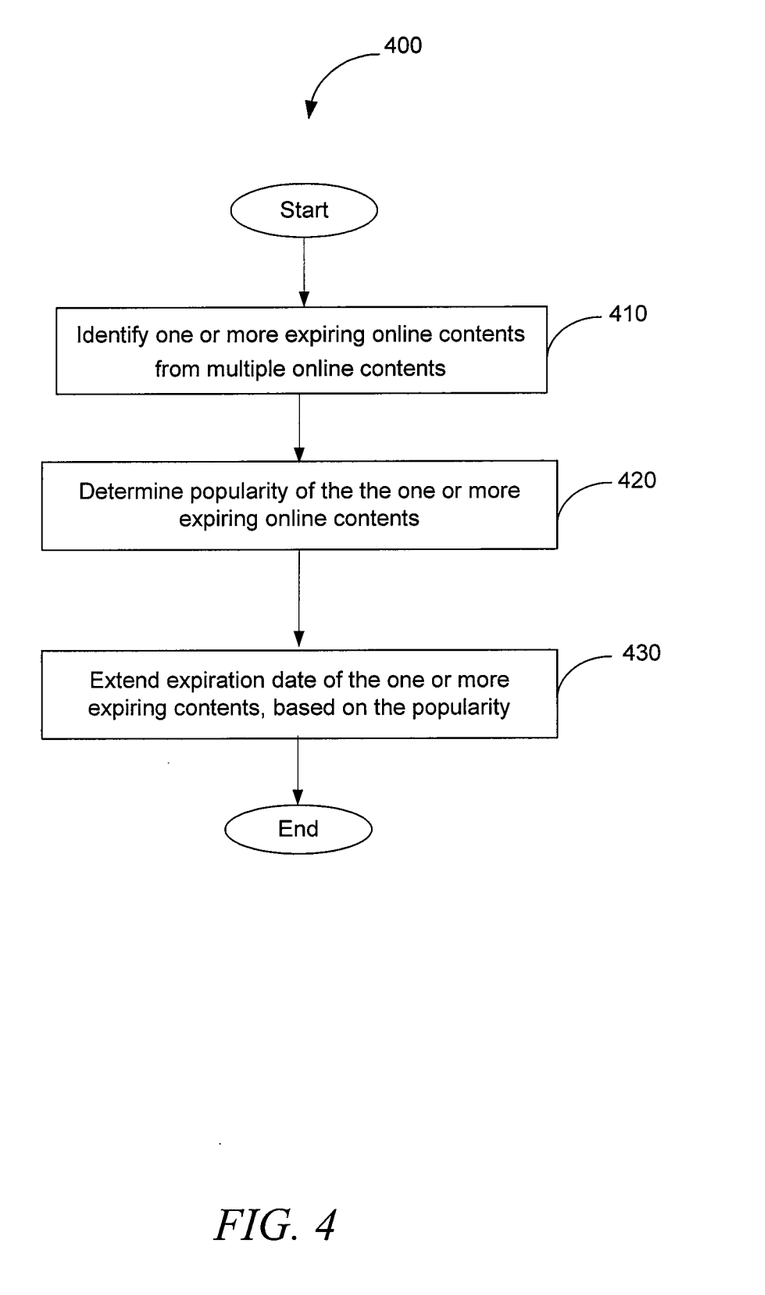
FIG. 4 is a high-level flow diagram illustrating an example method for keeping popular contents active.

FIG. 4 is a high-level flow diagram illustrating an example method 400 for compiling popular searches. The method 400 starts at operation 410, where the identification module 230 may identify one or more expiring online contents 110 (e.g., online contents that have reached expiration dates) from multiple online contents 120 currently running on a Website e.g., the Website hosted by the publication system 140. At operation 420, the popularity module 220 may determine popularity of the one or more expiring online contents 110. The popularity module 220 may determine the popularity of an online content based on the number of direct views of the online content or number of references to the online content by search engines, in a predetermined time interval (e.g., last week or last two weeks).

In an example embodiment, at operation 430, the extension module 250 may extend expiration dates of expiring online contents, based on the popularity. The extension module may extend the expiration date for an extension time, which may be determined based on popularity, using an algorithm, an example of which was described above in paragraph 28.

Figure 5:
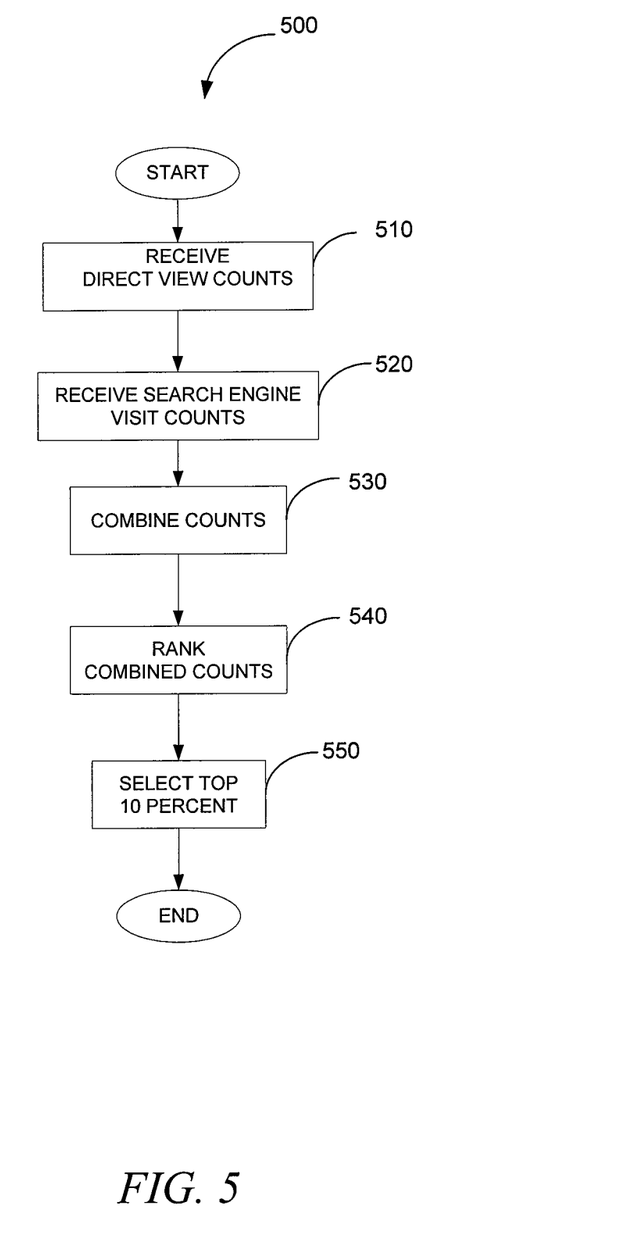
FIG. 5 is a flow diagram illustrating an example method for keeping popular contents active.

FIG. 5 is a flow diagram illustrating an example method 500 for keeping popular contents active. At operation 510, the processor module 330 may receive a first popularity factor, indicating the number of direct views of the online contents, in a predetermined time interval (e.g., last week or last two weeks), from the first counter 310. The processor module 330 may also receive, from the second counter 320, a second popularity factor representing the number of references (e.g., indirect visits) to the online contents by search engines during the predetermined time interval (operation 520). The processor module 330 may combine the first and the second popularity factors as discussed above, in paragraph 26, to calculate a popularity index Pi (operation 530). At Operation 540, the popularity module 220 may generate a list the online contents 120 and rank the online contents on the list according to the popularity index Pi. The popularity module 220 may select the top N percent, e.g., 10 percent, of the list as the popular online contents and extend the expiration date of the popular online contents.

Figure 6:
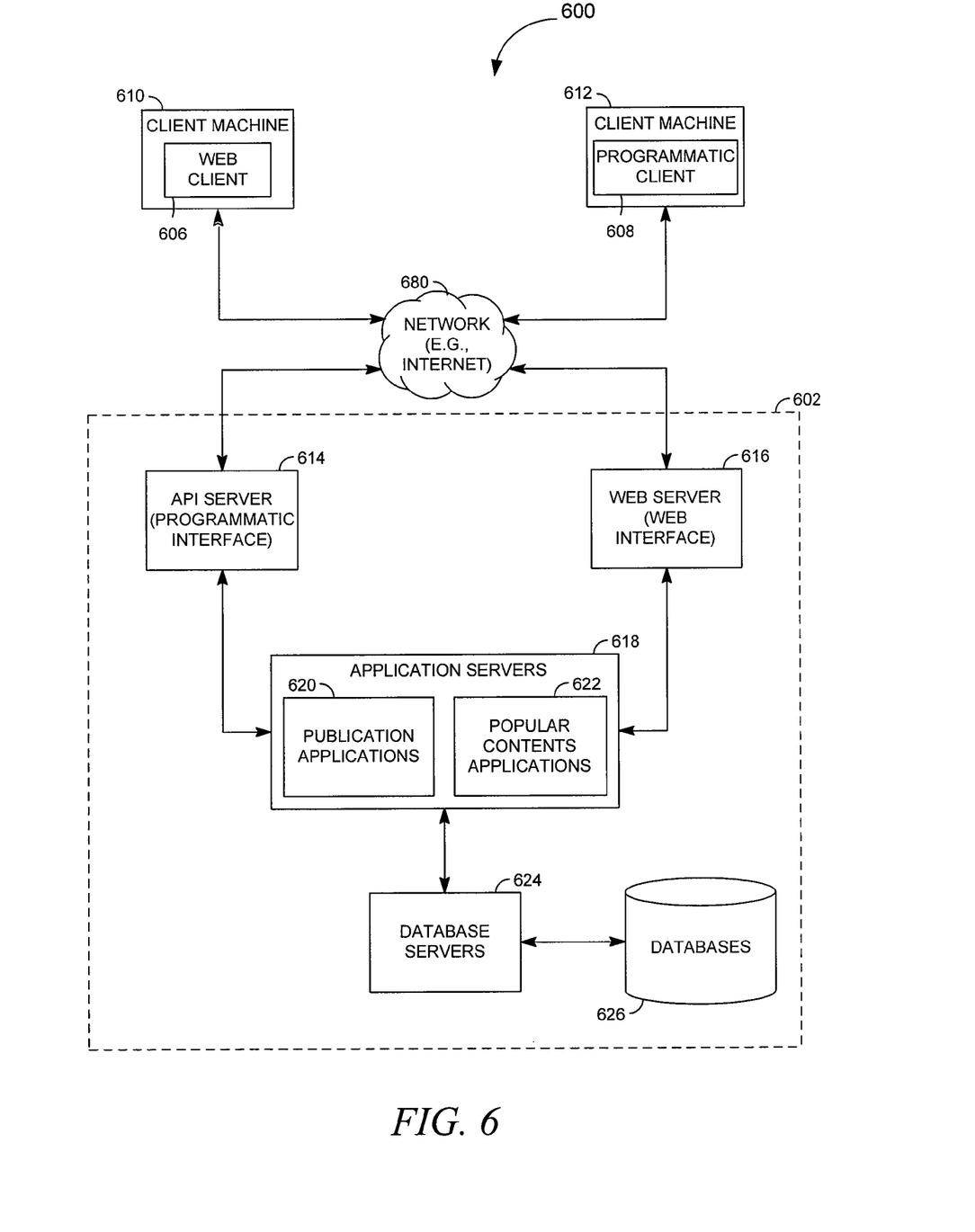
FIG. 6 is high-level block diagram illustrating an example embodiment of a network-based publication system enabled to keep popular contents active.

FIG. 6 is high-level block diagram illustrating an example embodiment of a network-based publication system 600 enabled for keeping poplar contents active. A publication platform, in the example form of a popular contents server 602, may provide server-side functionality, via a network 680 (e.g., the Internet) to one or more clients. FIG. 6 illustrates, for example, a Web client 606 (e.g., a browser, such as the INTERNET EXPLORER browser developed by Microsoft Corporation of Redmond, Wash.), and a programmatic client 608 executing on respective client machines 610 and 612.

Turning specifically to the popular contents server 602, an Application Program Interface (API) server 614 and a Web server 616 are coupled to, and provide programmatic and Web interfaces respectively to, one or more application servers 618. The application servers 618 host one or more publication applications 620 and popular contents applications 622. The application servers 618 are, in turn, shown to be coupled to one or more database servers 624 that facilitate access to one or more databases 626.

The publication applications 620 may provide a number of publication functions and services to users who access the network-based publication system 600. For example, the publication applications may support posting and browsing listings (e.g., items, services, etc.) in the network-based publication system 600. The popular contents applications 622 may compile a list of popular contents running on the network-based publication system 600 and extend the expiration dates of the popular online contents.

Further, while the network-based publication system 600 shown in FIG. 6 employs a client-server architecture, the disclosed system is not limited to such an architecture and could equally well find application in a distributed, or peerto-peer, architecture system. The various publication and popular contents applications 620 and 622 could also be implemented as stand-alone software programs, which do not necessarily have networking capabilities.

The web client 606 may access the publication and popular contents applications 620 and 622 via the web interface supported by the web server 616. Similarly, the programmatic client 608 may access the various services and functions provided by the publication and popular contents applications 620 and 622 via the programmatic interface provided by the API server 614. The programmatic client 608 may, for example, be a search application to enable buyers to search for listings of interest to the buyers in the network-based publication system 600. In another example embodiment, the programmatic client 608 may support sellers by facilitating posting of one or more items on the network-based publication system 600.

Figure 7:
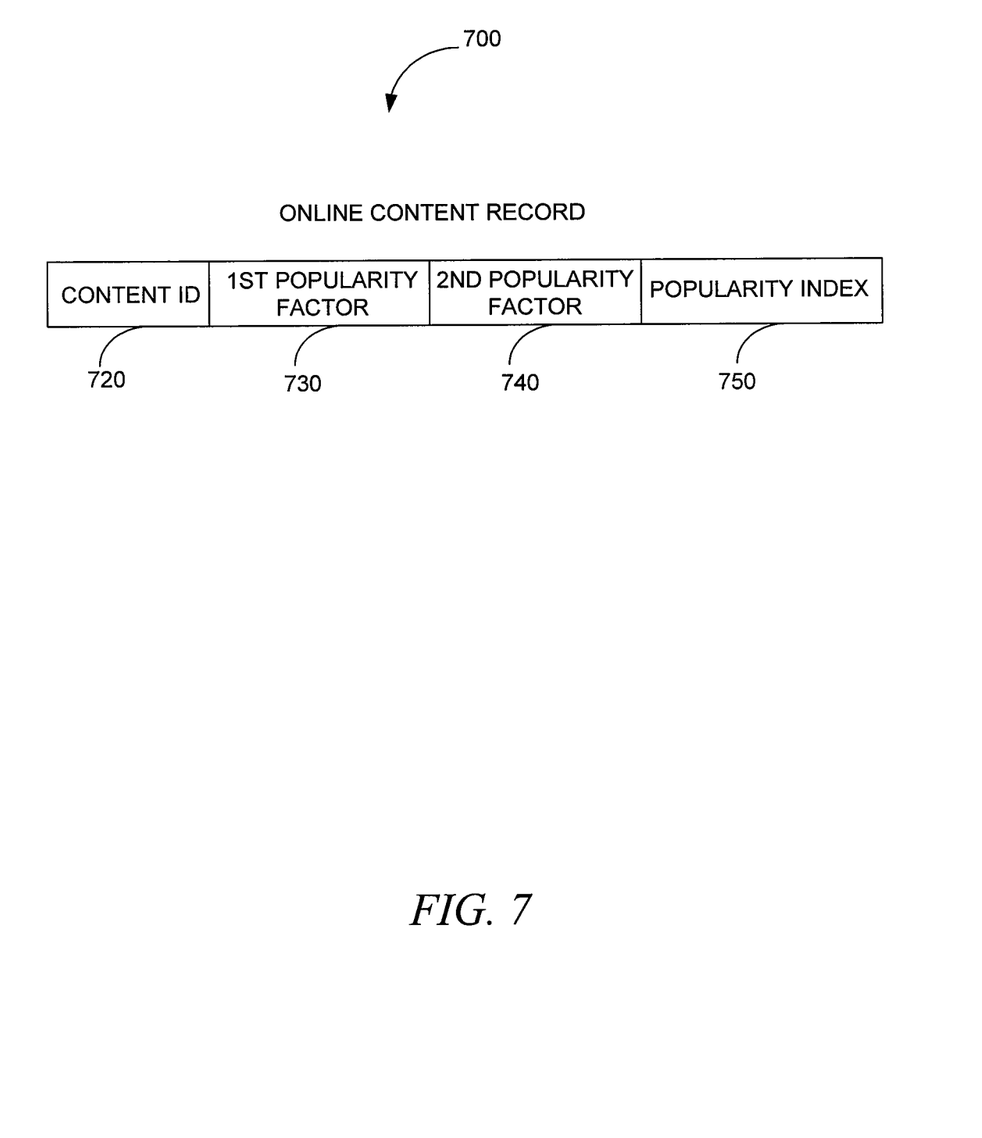
FIG. 7 is diagram illustrating, in an example embodiment, structure of an online content record.

FIG. 7 is diagram illustrating, in an example embodiment, structure of a record 700 of an online content. The record 700 may represent an example record stored in the databases 626 of the network-based publication system 600. The record 700 may include content identification (ID) field 720, a $1^{st}$ popularity factor field 730, a $2^{nd}$ popularity factor field 740, and a popularity index field 750. According to example embodiments, the content ID field 720 may store a unique identification associated with the online content. The 1st and the $2^{nd}$ popularity factor fields 730 and 740 may contain the first popularity factor and the second popularity factor. The first and the second popularity factors, as described above, may represent the number of direct views of the online content and the number of references to the online content by search engines in a predetermined time interval (e.g., last week or last two weeks), respectively. The popularity index field 750 may store a popularity index representing the popularity index Pi generated by the processor module 330 from combining the first and the second popularity factor, as discussed above.

In an example embodiment, the record structure may only include the content ID 720 and the popularity index 750. The popularity module 220, as discussed above, may use the popularity index pi, stored in the popularity index field 750, to determine popular contents.

Figure 8:
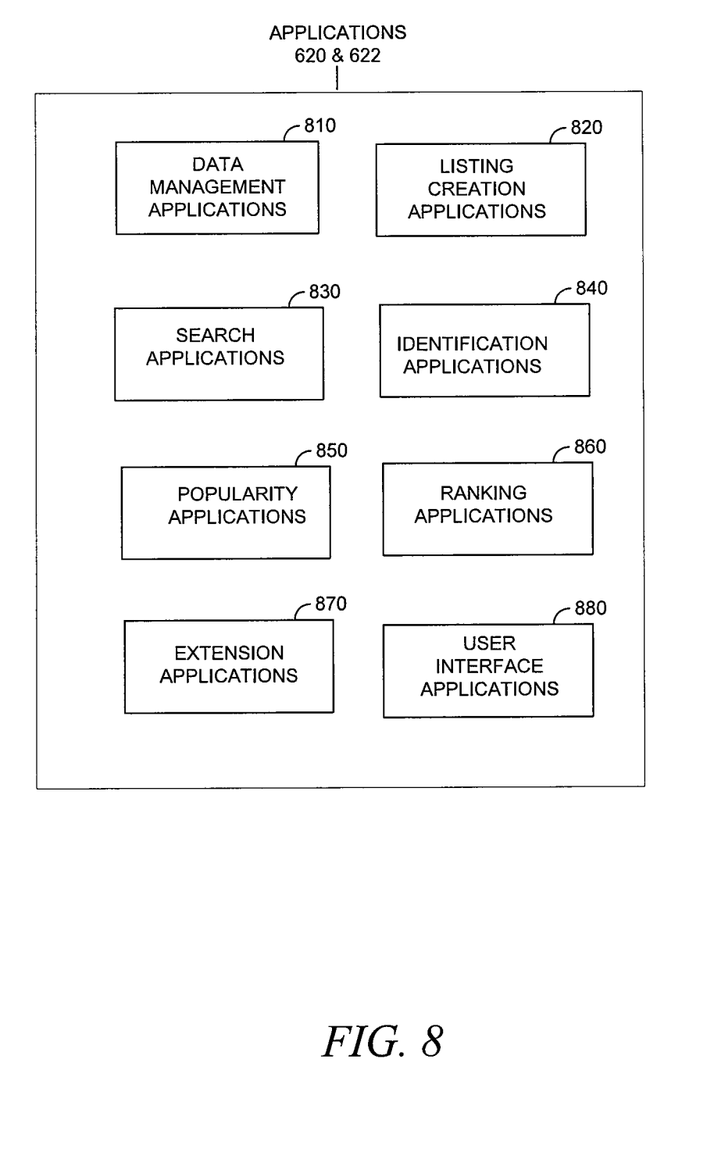
FIG. 8 is an example set of publication and popular contents applications used by the network-based publication system of FIG. 6.

FIG. 8 is an example set of publication and popular contents applications used by the network-based publication system of FIG. 6. The popular contents server 602 may provide a number of publication applications 620 and popular contents applications 622, whereby a user may post a listing or browse published listings in the network-based publication system 600, and the popular contents server 602 may compile one or more lists of popular searches for a geographic location (e.g., as a country or a city) under one or more categories.

Various data management applications 810 may provide support for handling data, including storing and retrieving data related to various listings published in the network-based publication system 600. The data management applications 810 may arrange for listing data to be categorized into specific categories based on certain keywords.

A number of listing creation applications 820 may allow sellers of items or posters of advertisements to conveniently author listings pertaining to goods or services that they wish to publish via the network-based publication system 600. The listing creation applications 820 may receive input data provided by the sellers or posters, and may have the data management applications 810 store the data in appropriate categories. The listing creation applications 820 may also provide listing information for the user interface applications 880 to display the listings to users.

A number of search applications 830 may support searching the databases 626 of the network-based publication system 600 data items, using search criteria received from a user of the network-based publication system 600. Identification applications 840 may facilitate identification of one or more expiring online contents by examining expiration dates associated with the online contents.

One or more popularity applications 850 may support determining a popularity of the expiring online contents. The popularity applications 850 may determine the popularity of the online contents, based on the number of direct views of the online content (N1) and the number of references to the online content by the search engines (N2), in a predetermined time interval (e.g., last week or last two weeks). The ranking applications 860 may rank a list of online contents compiled by the popularity application 850, according to a popularity index generated from the number of direct views, N1, and the number of indirect visits, N2, in a predetermined time interval (e.g., last week or last two weeks).

Extension applications 870 may facilitate extending the expiration dates of one or more expiring online contents for an extension time. The extension time may depend on the popularity of the expiring online content determined by the popularity application 850.

The user interface applications 880 may display various Web pages (see, for example, FIG. 10) showing, under various categories, published listings of the network-based publication system 600. The user interface applications 880 may also display pages whereby users may post advertisements for items or services in the network-based publication system 600.

Machine Architecture

Figure 9:
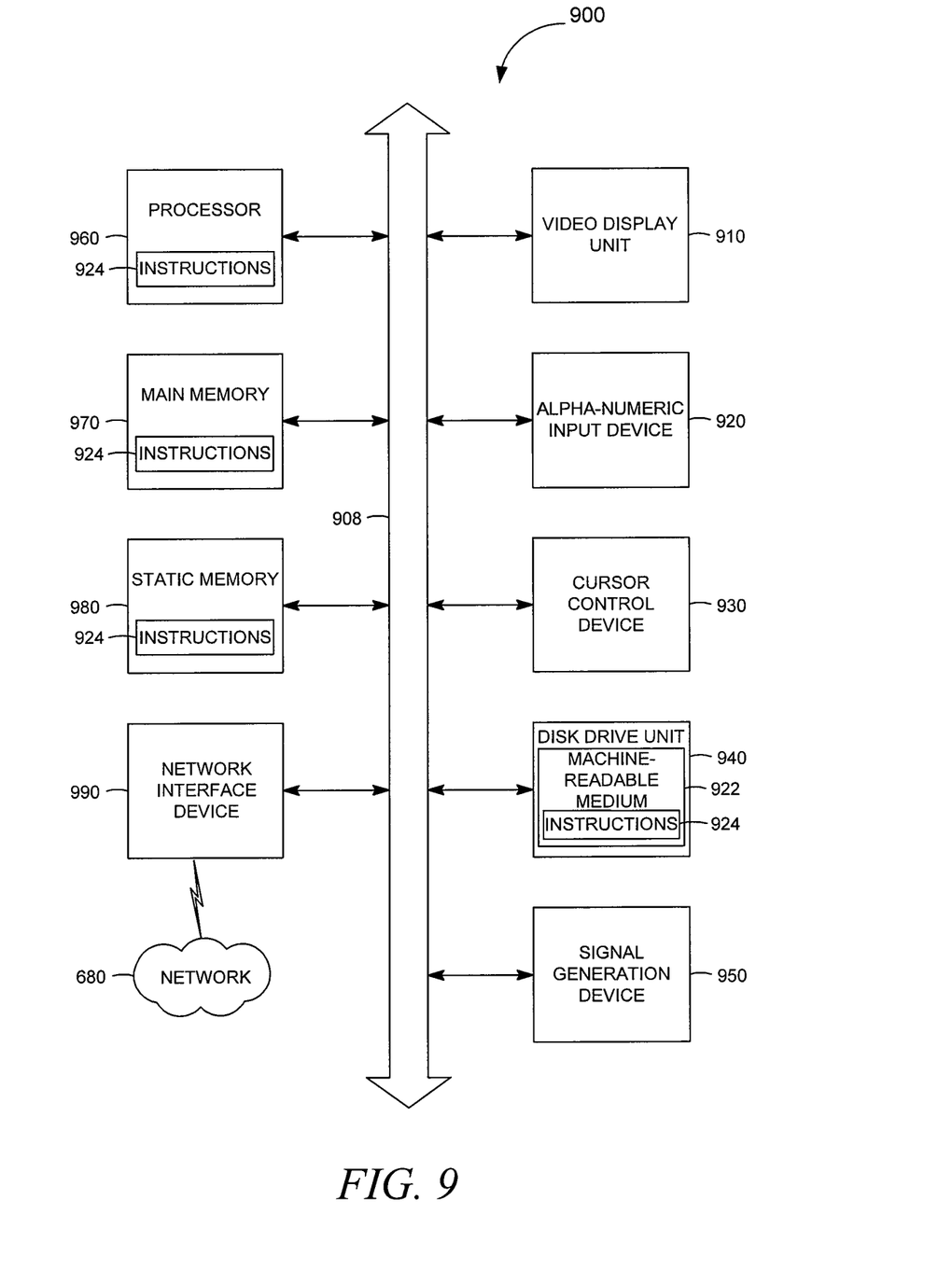
FIG. 9 is a block diagram illustrating a diagrammatic representation of a machine in the example form of a computer system.

FIG. 9 is a block diagram illustrating a diagrammatic representation of a machine 900 in the example form of a computer system, within which a set of instructions for causing the machine to perform any one or more of the methodologies discussed herein may be executed. In alternative embodiments, the machine 900 may operate as a standalone device or may be connected (e.g., networked) to other machines. In a networked deployment, the machine 900 may operate in the capacity of a server or a client machine in a server-client network environment, or as a peer machine in a peer-to-peer (or distributed) network environment.

The machine 900 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 may include a processor 960 (e.g., a central processing unit (CPU), a graphics processing unit (GPU) or both), a main memory 970 and a static memory 980, all of which communicate with each other via a bus 908. The computer system 900 may further include a video display unit 910 (e.g., a liquid crystal display (LCD) or cathode ray tube (CRT)). The computer system 900 also may include an alphanumeric input device 920 (e.g., a keyboard), a cursor control device 930 (e.g., a mouse), a disk drive unit 940, a signal generation device 950 (e.g., a speaker) and a network interface device 990.

The disk drive unit 940 may include a machine-readable medium 922 on which is stored one or more sets of instructions (e.g., software 924) embodying any one or more of the methodologies or functions described herein. The software 924 may also reside, completely or at least partially, within the main memory 970 and/or within the processor 960 during execution thereof by the computer system 900, with the main memory 970 and the processor 960 constituting machine-readable media.

The software 924 may further be transmitted or received over a network 680 via the network interface device 990.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

User Interface

Figure 10:
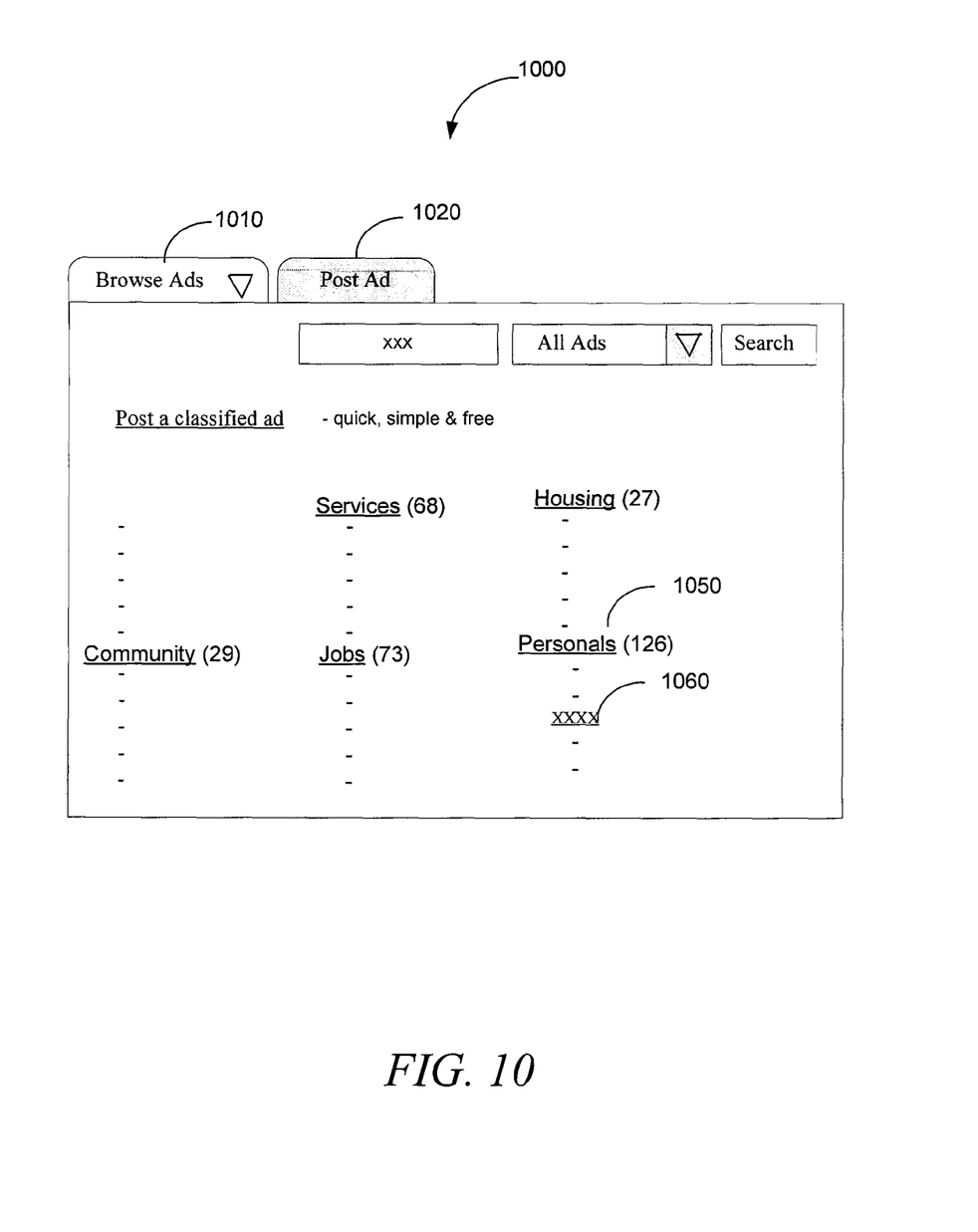
FIG. 10 is a screen shot illustrating an example embodiment of a page for presenting online advertisements.

FIG. 10 is a screen shot illustrating an example embodiment of a page 1000 for posting advertisements in a publication system. The page 1000 shows a tab 1010 (currently active) for browsing advertisements that are currently active, and a tab 1020 for posting new advertisements. Each of the listings, e.g., advertisements, may have an expiration date. The publication system 140 may identify the advertisement 1060 under the category Personals (1050) as an expiring online content. The publication system 140 may determine the popularity of the advertisement 1060 based on the number of direct views of the advertisement 1060 or the number of references to the advertisement 1060 by the search engines, in a predetermined time interval (e.g., last week or last two weeks). The publication system 140 may keep the advertisement 1060 active for an extension time after a time when the advertisement 1060 is to expire. The extension time may depend on the popularity of the advertisement 1060.

Thus, a method and a system for keeping popular advertisements active have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    identifying at least one expiring online content from a plurality of online contents;
    determining popularity of the at least one expiring online content, the popularity based on a first popularity factor and a second popularity factor, wherein the first popularity factor is a number of direct views of the content by users in a predetermined time interval and the second popularity factor is a number of references to the content by search engines in the predetermined time interval;
    using one or more processors to calculate an extension time based on an algorithm that defines the extension time as a function of the popularity; and
    extending an expiration date of the at least one expiring online content by the extension time.

* * * * *